United States Patent
Zisimopoulos et al.

(10) Patent No.: US 9,420,526 B2
(45) Date of Patent: *Aug. 16, 2016

(54) RETRIEVAL OF USER EQUIPMENT CAPABILITIES BY APPLICATION SERVER

(71) Applicant: Samsung Electronics Co., Ltd., Suwon-si, Gyeonggi-do (KR)

(72) Inventors: Haris Zisimopoulos, London (GB); Ricky Kaura, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/803,640

(22) Filed: Jul. 20, 2015

(65) Prior Publication Data

US 2015/0327161 A1 Nov. 12, 2015

Related U.S. Application Data

(63) Continuation of application No. 13/818,025, filed as application No. PCT/KR2011/006151 on Aug. 19, 2011, now Pat. No. 9,088,936.

(30) Foreign Application Priority Data

Aug. 20, 2010 (GB) .................................. 1014032.5

(51) Int. Cl.
*H04W 48/18* (2009.01)
*H04W 36/14* (2009.01)
*H04W 76/02* (2009.01)

(52) U.S. Cl.
CPC .............. *H04W 48/18* (2013.01); *H04W 36/14* (2013.01); *H04W 76/02* (2013.01)

(58) Field of Classification Search
CPC ..... H04W 36/14; H04W 48/18; H04W 36/12; H04W 36/00; H04W 4/02; H04W 28/0226; H04W 40/36; H04W 4/12; H04W 88/18; H04W 36/30; H04W 36/18; H04W 36/08; H04W 36/05; H04W 76/02; H04L 12/5825; H04L 51/06; H04L 45/306; H04M 2203/158
See application file for complete search history.

(56) References Cited

U.S. PATENT DOCUMENTS 8,503,391 B2 * 8/2013 Mahdi ............... H04W 36/0022 370/331
8,804,661 B2 * 8/2014 Wu .................... H04W 36/0022 370/331

(Continued)

FOREIGN PATENT DOCUMENTS

CN 1878344 A 12/2006
EP 1 435 748 A1 7/2004

(Continued)

OTHER PUBLICATIONS

LG Electronics, Update to alternative #8, sub-alternative 1, 3GPP TSG-SA WG2#79, 3GPP, S2-102383, May 14, 2010.

(Continued)

*Primary Examiner* — Meless Zewdu
(74) *Attorney, Agent, or Firm* — Jefferson IP Law, LLP

(57) ABSTRACT

The present invention provides a method of establishing a call to or from a user equipment in a wireless communication system comprising a first wireless network and a second wireless network, the second wireless network having an association with the first wireless network, the wireless communication system having a serving node and an application server capable of communication with said serving node, and the method comprising: receiving a message from said serving node at the application server, said message having information regarding network capabilities of said user equipment; and determining at the application server whether to anchor said call in the first wireless network or the second wireless network dependent on said information regarding network capabilities of said user equipment.

12 Claims, 4 Drawing Sheets

(56) References Cited

U.S. PATENT DOCUMENTS

| | | | |
|---|---|---|---|
| 8,824,417 B2* | 9/2014 | Keller | H04W 36/0022 370/331 |
| 8,964,961 B2 | 2/2015 | Keller et al. | |
| 8,971,875 B2 | 3/2015 | Vedrine et al. | |
| 2004/0137900 A1* | 7/2004 | Varonen | H04W 4/02 455/433 |
| 2004/0137918 A1* | 7/2004 | Varonen | H04W 8/10 455/456.2 |
| 2004/0218605 A1 | 11/2004 | Gustafsson et al. | |
| 2006/0258358 A1* | 11/2006 | Kallio | H04W 36/0066 455/437 |
| 2007/0156704 A1* | 7/2007 | De Boer | H04W 8/18 |
| 2007/0209061 A1 | 9/2007 | Dekeyzer et al. | |
| 2007/0217354 A1* | 9/2007 | Buckley | H04L 65/1083 370/328 |
| 2008/0268847 A1* | 10/2008 | Mukherjee | H04W 36/005 455/436 |
| 2009/0262733 A1 | 10/2009 | Olson | |
| 2010/0040020 A1 | 2/2010 | Chen | |
| 2010/0050234 A1* | 2/2010 | Lindholm | H04W 8/04 726/3 |
| 2010/0087186 A1 | 4/2010 | Gupta et al. | |
| 2010/0113010 A1 | 5/2010 | Tenny et al. | |
| 2010/0177691 A1 | 7/2010 | Patil et al. | |
| 2010/0290448 A1 | 11/2010 | Rune | |
| 2010/0311386 A1* | 12/2010 | Edge | H04W 36/0022 455/404.1 |
| 2010/0329244 A1* | 12/2010 | Buckley | H04W 76/026 370/352 |
| 2011/0019650 A1 | 1/2011 | Van Niekerk | |
| 2011/0164564 A1* | 7/2011 | Vedrine | H04W 36/0033 370/328 |
| 2011/0200011 A1* | 8/2011 | Rune | H04W 36/0022 370/331 |
| 2012/0115489 A1* | 5/2012 | Shuai | H04W 36/14 455/438 |
| 2012/0120914 A1* | 5/2012 | Sedlacek | H04W 60/005 370/331 |
| 2013/0028179 A1* | 1/2013 | Sedlacek | H04L 65/1073 370/328 |
| 2013/0128865 A1 | 5/2013 | Wu et al. | |
| 2015/0056995 A1* | 2/2015 | Baillargeon | H04W 36/0022 455/436 |

FOREIGN PATENT DOCUMENTS

| | | |
|---|---|---|
| EP | 1 519 534 A1 | 3/2005 |
| WO | 2006/138736 A2 | 12/2006 |
| WO | 2009006196 A2 | 1/2009 |
| WO | 2009/091295 A1 | 7/2009 |

OTHER PUBLICATIONS

Samsung Electronics, VCC cross phase compatibility issues, 3GPP TSG-SA WG2#52, 3GPP, S2-061658, May 12, 2006.

Zte, HSS-based solutions to improve T-ADS in the SCC AS, 3GPP TSG-SAWG2#77, 3GPP, S2-100443, Jan. 22, 2010.

Falconetti et al. "Distributed Uplink Macro Diversity for Cooperating Base Stations," IEEE International Conference on Communications Workshops, Jun. 14-18, 2009, pp. 1-5.

Teyeb, O. et al. "Handover Framework for Relay Enhanced LTE Networks," IEEE International Conference on Communications Workshops, Jun. 14-18, 2009, pp. 1-5.

Samsung, Anchoring Decision based on SRVCC capability alt.2, 3GPP TSG-SA WG2#80, 3GPP, Sep. 3, 2010 S2-103607.

NTT Docomo, Samsung, Solution Alternatives for anchoring decision based on SRVCC capability, 3GPP TSG-SA NG2#80, 3GPP, Sep. 3, 2010, S2-103621.

* cited by examiner

RETRIEVAL OF USER EQUIPMENT CAPABILITIES BY APPLICATION SERVER

CROSS-REFERENCE TO RELATED APPLICATION(S)

This is a continuation application of a prior U.S. patent application assigned Ser. No. 13/818,025, filed Feb. 20, 2013, which issued as U.S. Pat. No. 9,088,936 on Jul. 21, 2015, and which claims the benefit under 35 U.S.C. §371 of an International application filed on Aug. 19, 2011, and assigned application No. PCT/KR2011/006151, which claims the benefit of a United Kingdom patent application filed on Aug. 20, 2010, in the Intellectual Property Office of the United Kingdom and assigned Serial number 1014032.5, the entire disclosures of each which are hereby incorporated by reference.

TECHNICAL FIELD

The present invention relates generally to wireless communication systems, and more specifically, to a method and apparatus for retrieving information regarding network capabilities of a user equipment by an applications server.

BACKGROUND ART

Wireless communications systems comprising wireless networks, in which a user equipment (UE) such as a mobile handset communicates via wireless links to a network of base stations or other wireless access points connected to a telecommunications network, have undergone rapid development through a number of generations of radio access technology. The initial deployment of systems using analogue modulation has been superseded by second generation (2G) digital systems such as GSM (Global System for Mobile communications), typically using GERA (GSM Enhanced Data rates for GSM Evolution Radio Access) radio access technology, and these systems have themselves been replaced by or augmented by third generation (3G) digital systems such as UMTS (Universal Mobile Telecommunications System), using the UTRA (Universal Terrestrial Radio Access) radio access technology. Third generation standards provide for a greater throughput of data than is provided by second generation systems; this trend is continued with the proposals by the Third Generation Partnership Project (3GPP) of the Long Term Evolution (LTE) system, using E-UTRA (Evolved UTRA) radio access technology, which offers potentially greater capacity and additional features compared with the previous standards.

Note that the term "GERA" is used herein to refer to the radio access technology associated with GERAN (GERA networks) wireless networks, "UTRA" is used to refer to the radio access technology associated with UTRAN (UTRA networks) wireless networks, and similarly the term "E-UTRA" or "LTE" is used to refer to the radio access technology associated with E-UTRAN (E-UTRA networks) wireless networks.

LTE is designed primarily as a high speed packet switched network, and voice services, packet switched voice services and in particular Voice over Internet Protocol Multimedia Subsystem (VoIMS) services are envisaged, whereas previous generation systems such as UMTS support voice services that are primarily circuit switched.

As new technology is introduced, networks are typically deployed which include radio access networks that use a radio access technology according to a recent standard and also legacy radio access networks that use a legacy radio access technology. A user equipment may be typically capable of communication using two or more radio access technologies, so for example the user equipment is able operate using one radio access technology, perhaps offering high capacity, where this is available, but being able to operate using a legacy radio access technology, in those service areas of the network that do not support the other radio access technology, or that do not support preferred features.

There are a variety of handover procedures that have been developed to allow handover of a user equipment between a E-UTRA network and a UTRA/GERA network. In particular, handover procedures have been developed to allow handover when a voice call is in progress, that is to say so-called Voice Call Continuity (VCC) handover procedures. Typically a VCC procedure will be implemented under the control of a session transfer controller, which will typically comprise a Service Centralization and Continuity Application Server (SCC AS) and a Serving Call Session Control Function and/or Interrogating Call Session Control function (I/S-CSCF). The session transfer controller is typically implemented in the Internet Protocol Multimedia Subsystem (IMS).

The IMS is typically used to control packet switched services offered over the E-UTRA network; control of circuit switched services in a UTRA/GERA network typically involves a mobility controller, such as a Mobility Switching Centre (MSC). The session transfer controller typically communicates with the mobility controller during handover according to a VCC procedure.

A user equipment may be equipped with a single radio transceiver, for reasons of economy or for minimizing power consumption, so that simultaneous communication with two radio access networks is not possible. In this case the handover protocol typically uses a break-before-make radio connection during handover. Handover procedures known as Single Radio Voice Call Continuity (SR VCC) procedures may be available for use in some user equipments.

SUMMARY

A call may typically be anchored, so that if an access connection to or from a user equipment is changed during a call, the remainder of the routing of the call beyond an anchor point is unchanged. When handing over from a wireless network offering packet switched services to a wireless network offering circuit switched services, it may be necessary to change the call from being anchored in the packet switched wireless network to being anchored in the circuit switched network, but this may involve an undesirable delay. It may be possible to anchor all calls in the circuit switched network at the establishment of the calls, but this may be wastefully of resources of the circuit switched network.

Other types of application server, for use in wireless communications systems, such as a Machine-Type Communications Server, may also suffer from inefficient performance of applications due to the need to cater for user equipments of differing capabilities.

Aspects of the invention address disadvantages of prior art systems.

In accordance with a first aspect of the present invention, there is provided a method of establishing a call to or from a user equipment in a wireless communication system comprising a first wireless network and a second wireless network, the second wireless network having an association with the first wireless network, the wireless communication system having a serving node and an application server capable of communication with said serving node, and the method comprising: receiving a message from said serving node at the application server, said message having information regarding network capabilities of said user equipment; and determining at the application server whether to anchor said call in the first wireless network or the second wireless network dependent on said information regarding network capabilities of said user equipment.

An advantage of determining whether to anchor the call in the first wireless network or the second wireless network dependent on network capabilities of said user equipment is that a change in anchoring during the call, and its associated delay, may be avoided by selecting an appropriate network to anchor the call on establishment of the call, taking into account the possibility or otherwise of a change in anchoring during a call, which may be dependent on the network capabilities of said user equipment.

In an embodiment of the invention, the first wireless network is capable of supporting packet switched voice communication and the second wireless network is capable of supporting circuit switched voice communication.

It is particularly advantageous to avoid a change in anchoring of a call between a network supporting packet switched voice communication and a network supporting circuit switched voice communication, since this may involve introducing an unacceptable delay. The possibility of a change in anchoring of a call between a network supporting packet switched voice communication and a network supporting circuit switched voice communication may depend on the network capabilities of the user equipment.

In an embodiment of the invention, said message relates to whether or not said user equipment has a single radio interface for communicating with the first wireless network and the second wireless network, such that only one radio connection with a wireless network can exist at any given point in time.

In an embodiment of the invention, said message relates to an ability of said user equipment to perform Single Radio Voice Call Continuity (SRVCC) procedures.

It is particularly advantageous to determine a network in which to anchor the call on the basis of the capability of the user equipment to perform SRVCC procedures, since the capability is an indicator of the possibility that a change in anchoring of a call between a network supporting packet switched voice communication and a network supporting circuit switched voice communication may take place during the call.

In an embodiment of the invention, the method comprises anchoring said call in the second wireless network dependent at least on said message indicating that said user equipment has the ability to perform Single Radio Voice Call Continuity (SRVCC) procedures.

In an embodiment of the invention, said serving node is in the first wireless network, and said serving node may be a Mobility Management Entity (MME).

Alternatively, in an embodiment of the invention, said serving node may be in the second wireless network and may be a Serving GPRS Support Node (SGSN) or may be a Mobile Switching Centre (MSC).

In an embodiment of the invention, the application server comprises a Service Centralization and Continuity Application Server (SCC AS).

In an embodiment of the invention, the method further comprises:

sending a request message from the application server to said serving node requesting network capabilities of said user equipment.

This has an advantage of prompting said serving node to send the message having information regarding network capabilities of said user equipment.

In an embodiment of the invention, the method comprises:

determining at the application server whether to anchor said call in the first wireless network or the second wireless network in further dependence on an indication of an access network over which said call is originated or terminated.

This may be advantageous, since the possibility that a change in anchoring of a call between a network supporting switched voice communication and a network supporting circuit switched voice communication may depend on a type of access network over which said call is originated or terminated, in addition to the capabilities of the user equipment. For example, a SRVCC handover may not be possible to a WiFi network.

In accordance with a second aspect of the invention there is provided an application server for use in assisting establishment of a call to or from a user equipment in a wireless communication system comprising a first wireless network and a second wireless network, the second wireless network having an association with the first wireless network, the wireless communication system having a serving node capable of communication with the application server, and the application server being arranged to: receive a message from said serving node, said message having information regarding network capabilities of said user equipment; and determine whether to anchor said call in the first wireless network or the second wireless network dependent on said information regarding network capabilities of said user equipment.

In accordance with a third aspect of the invention there is provided a method of adapting performance of an application at an application server according to network capabilities of a user equipment in a wireless communication system, the wireless communication system having a serving node capable of communication with the application server, the method comprising: sending a first message from the application server to said serving node requesting network capabilities of said user equipment; receiving a second message from said serving node at the application server, said message conveying information regarding network capabilities of said user equipment; and adapting performance of said application at the application server on the basis of the second message.

This has an advantage that the performance of the application server may be optimized, since not all user equipments may have the same network capabilities, so that operations at the application server specific to certain network capabilities not appropriate to said user equipment may be avoided.

In an embodiment of the invention, the wireless communication system comprises a first wireless network and a second wireless network, the second wireless network has an association with the first wireless network and the application server has an association with the first wireless network.

In an embodiment of the invention, said serving node may be in the first wireless network, and may be a Mobility Management Entity (MME).

Alternatively, in an embodiment of the invention, said serving node may be in the second wireless network, and may be a Serving GPRS Support Node (SGSN) or may be a Mobile Switching Centre (MSC).

In an embodiment of the invention, the method comprises sending the first message and receiving the second message via a Home Subscriber Server (HSS). It may be convenient to use Diameter Sh-pull mechanism to implement the first and second messages.

In an embodiment of the invention, the application server comprises a Service Centralization and Continuity Application Server (SCC AS).

Alternatively, in an embodiment of the invention, said application server is a Machine-Type Communications Server and the requested network capabilities of said user equipment relate to user equipment transport capabilities.

This has an advantage that operations of the application server applicable to specific transport capabilities of the equipment may be avoided if said user equipment does not have these capabilities.

In an embodiment of the invention, said application server is a Machine-Type Communications Server and the requested network capabilities of the user equipment relate to said user equipment being a low priority device.

This has an advantage that operations of the application server applicable to higher priority devices may be avoided if said user equipment is a low priority device.

In an embodiment of the invention, the requested network capabilities of said user equipment relate to I1 capability of said user equipment.

In accordance with a fourth aspect of the invention there is provided an application server arranged to adapt performance of an application according to network capabilities of a user equipment in a wireless communication system, the wireless communication system having a serving node capable of communication with the application server, the application server being arranged to: send a first message to said serving node requesting network capabilities of the user equipment; receive a second message from said serving node, said message conveying information regarding network capabilities of said user equipment; and adapt performance of the application on the basis of the second message.

Further features and advantages of the invention will be apparent form the following description of preferred embodiments of the invention, which are given by way of example only.

According to the present invention, it is particularly advantageous to avoid a change in anchoring of a call between a network supporting packet switched voice communication and a network supporting circuit switched voice communication, since this may involve introducing an unacceptable delay.

DETAILED DESCRIPTION

Figure 1:
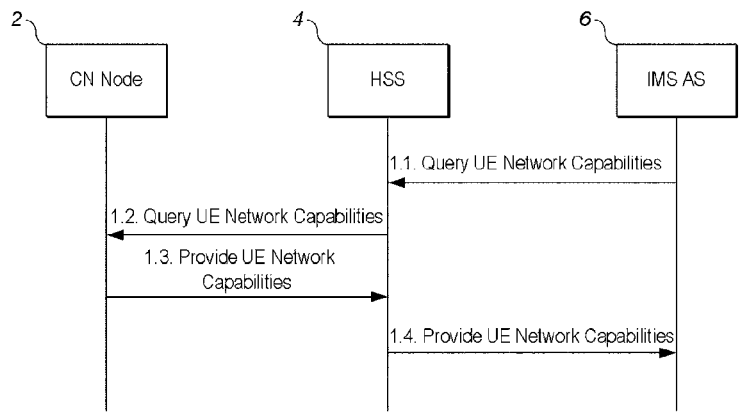
FIG. 1 is a schematic diagram showing signaling paths for querying of network capabilities of a user equipment by an IMS Application Server in an embodiment of the invention.

By way of example a first embodiment of the invention will now be described in the context of a wireless communications system including a wireless network, that may be a radio access network, supporting communication using E-UTRA/LTE radio access technology, as associated with E-UTRAN networks in LTE systems, supporting packet switched voice communication, and another wireless network supporting communication using GERA/UTRA radio access technology, as associated with GERAN/UTRAN networks in GSM/UMTS systems, supporting circuit switched voice communication. The wireless communication system has an application server, typically a Service Centralization and Continuity Application Server Application Server (SCC AS) within the Internet Protocol Multimedia Subsystem (IMS) associated with the E-UTRAN network However, it will be understood that this is by way of example only and that other embodiments may involve wireless networks using other radio access technologies, such as IEEE802.16 WiMax systems; embodiments are not limited to the use of a particular radio access technology, nor are embodiments limited to situations involving more than one wireless network. Embodiments of the invention may relate to other types of application server, such as a Machine-Type Communications Server.

The first embodiment relates to the retrieval of network capabilities by an applications server from user equipment relating to the ability of the user equipment to carry out single radio voice call continuity (SRVCC) procedures. If a user equipment has this capability, the application server determines that a call should be anchored in the GERAN/UTRAN network, on establishment of the call. Signaling for the call is typically anchored within the access transfer control function (ATCF) and call data is typically anchored within the access transfer gateway (ATGW). Anchoring in the GERAN/UTRAN network, on establishment of the call avoids the delay involved in transferring the anchoring of the call once the call is established, in the eventuality that SRVCC procedures are activated. However, if the user equipment does not have a SRVCC capability, then the call is anchored in the E-UTRAN network, typically within the IMS, on establishment, so avoiding unnecessary use of GERAN/UTRAN resources. The user capability is typically retrieved from a serving node, so that it is typically not necessary to query the user equipment on establishment of the call, so that procedures involving communication with the user equipment are typically not affected.

The operation of the first embodiment may be illustrated by reference to the following deployment scenarios. Initial deployments of E-UTRAN networks are typically within areas of coverage of existing wireless networks, such as legacy GERAN/UTRAN networks. On initial deployment, a E-UTRAN network provides service to a smaller geographical area than that covered by existing legacy networks, covering for example city centers, and the areas covered may not be contiguous. Furthermore, only a subset of the available network features may be enabled, and the enablement of features may not be uniform across the network. In particular, due to its potentially enhanced data capacity in comparison with legacy systems, initial deployments of E-UTRAN may concentrate on providing high bandwidth data services, for example to LTE enabled equipment such as personal digital assistants (PDAs) or to user equipment in the form of plug in communication modules for laptop computers. For this reason, the primary LTE voice service, a packet switched service known a Voice over IMS (VoIMS), may not be available in certain areas.

If a user equipment moves out of an area of coverage of an E-UTRAN network, then a handover to a GERAN/UTRAN network may be required, and the handover may be a Single Radio Voice Call Continuity (SRVCC) handover. Not all user equipments have SRVCC capability.

An alternative procedure, that may be termed Dual Radio Voice Call Continuity (DRACK), is a capability that is available to some user equipments having dual radios. By this procedure may be seen as a domain transfer that involves two calls, rather than a handover, since the user equipment itself establishes a call in each domain, that is to say in each wireless network. As such, there is no need for transfer of anchoring between networks as a result of a DRACK procedure.

Some user equipment may have neither SRVCC nor DRACK capability.

A typical network configuration for the first embodiment may be as follows. A user equipment may be connected to a first radio access network, being for example a E-UTRAN radio access network, and handover is required to a second radio access network, in this example a UTRAN/GERAN radio access network, so that the user equipment, on handover to the second radio access network, is connected to the UTRAN/GERAN radio access network. The first radio access network has a core network that may include a Mobile Management Entity (MME), which may be a serving node, and a Home Subscriber Server (HSS) which acts in support of handover within E-UTRAN. An Internet Protocol Multimedia subsystem (IMS) includes an application server, that is to say an IMS application server, typically a Service Centralization and Continuity Application Server Application Server (SCC AS) 10, which is typically capable of communication with the second radio access network, and a Serving Call Session Control Function and/or Interrogating Call Session Control function (I/S-CSCF).

The second radio access network has a serving node, typically a Serving GPRS Support Node (SGSN), or a Mobile Switching Centre (MSC) or Mobile Switching Centre Server (MSC-S).

FIG. 1 is a schematic diagram showing signaling paths for querying of network capabilities of a user equipment by an IMS Application Server 6. At steps 1.1 and 1.2, a request message is sent from the application server, in this example the IMS application server 6, to a Core Network (CN) node 2, typically a serving node, requesting network capabilities of a user equipment. The request message may be sent via a Home Subscriber Server (HSS) 4. A message is sent at steps 1.3 and 1.4 from the Core Network node 2 and received at the IMS Application Server 6, having information regarding network capabilities of the user equipment; this message may also be sent via the Home Subscriber Server (HSS) 4. The message providing user equipment network capabilities may typically be sent in response to receipt of the request message.

On receipt of the message providing user equipment network capabilities, the application server typically determines whether to anchor the call in the first wireless network, i.e., the E-UTRAN in this example, or in the second wireless network, in this example the UTRAN/GERAN.

Figure 2:
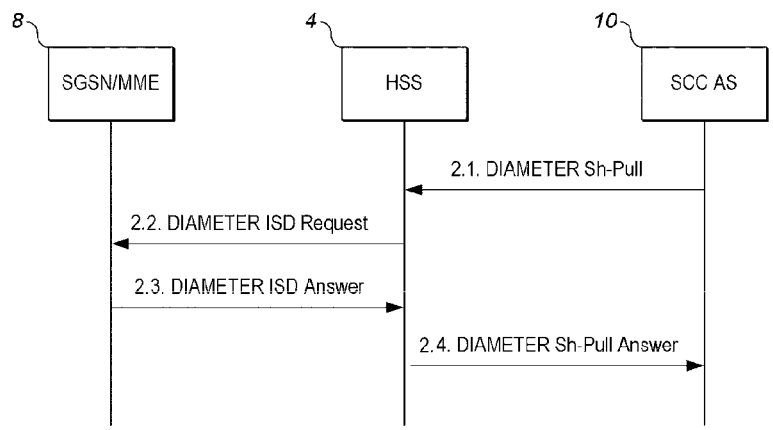
FIG. 2 is a schematic diagram showing signaling paths for querying of network capabilities of a user equipment by a Service Centralization and Continuity Application Server (SCC AS) in an embodiment of the invention.

FIG. 2 shows a more specific example of the first embodiment, showing signaling paths for querying of network capabilities of a user equipment by a Service Centralization and Continuity Application Server (SCC AS) 10. In this example, the serving mode 8 may be either a SGSN or MME. At step 2.1, a Diameter Sh-Pull message is sent to the HSS 4, and at step 2.2, the HSS 4 sends a Diameter Insert Subscriber Data (ISD) request to the SSGN or MME as appropriate, steps 2.1 and 2.2 being queries of user equipment network capabilities. At step 2.3, the serving node 8, that is to say the SGSN/MME as appropriate, sends a Diameter ISD Answer to the HSS 4, and at step 2.4 the HSS 4 sends a Diameter Sh-Pull Answer to the SCC AS 10. The messages at steps 2.3 and 2.4 provide user equipment network capabilities.

Figure 3:
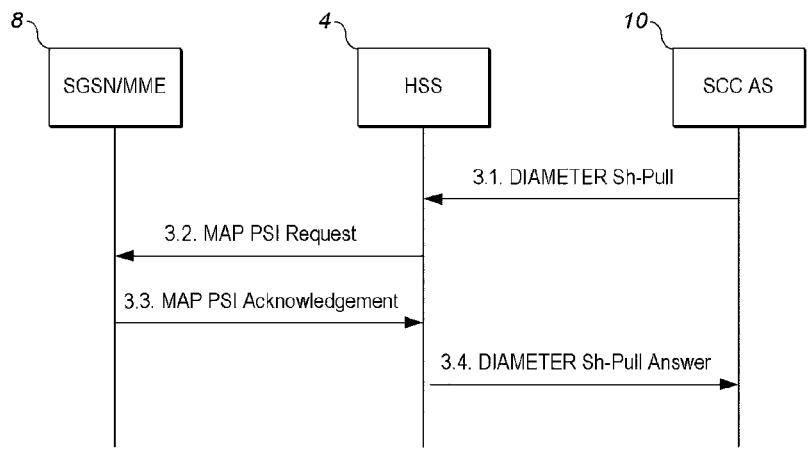
FIG. 3 is a schematic diagram showing alternative signaling paths for querying of network capabilities of a user equipment by a SCC AS in an embodiment of the invention.

FIG. 3 shows an alternative example of the first embodiment. Steps 3.1 and 3.4 proceed similarly to steps 2.1 and 2.4 already described, for communication between the HSS 4 and the SCC AS 10. However, for communication between the HSS 4 and SGSN/MME 8, at steps 3.2 and 3.3, a MAP procedure is used. At step 3.2 a MAP PSI request is sent to the SGSN/MME 8, querying UE network capabilities, and at step 3.3 a MAP PSI acknowledgement is sent by the SGSN/MME 8 providing user equipment network capabilities.

Figure 4:
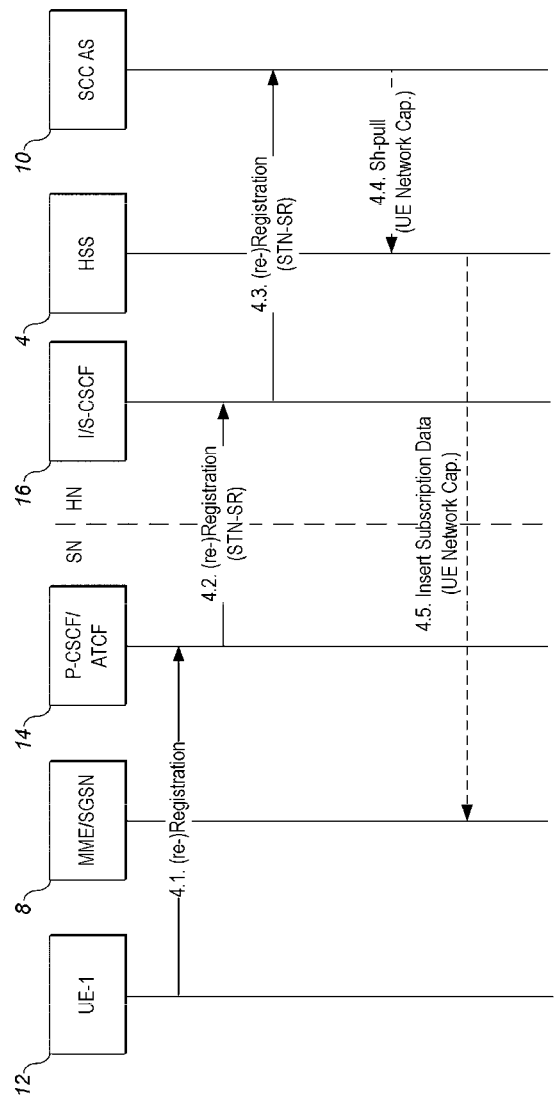
FIG. 4 is a schematic diagram showing signaling paths for requesting user equipment network capabilities during user equipment registration in an embodiment of the invention.

FIG. 4 is a schematic diagram showing signaling paths for requesting user equipment network capabilities during user equipment registration, triggering a request for user equipment capability information to be sent by the SCC AS 10. FIG. 4 shows an example of a conventional sequence of messages is shown at steps 4.1, 4.2, and 4.3, sent from a first user equipment 12, to a Proxy Call Session Control Function (P-CSCF) or ATCF 14, to a Interrogating/Serving Call Session Control Function (I/S-CSCF) 16 and thence to a SCC AS 10. In order to determine the user equipment network capabilities, for example regarding SRVCC capability, the SCC AS 10 sends a Sh-pull message at step 4.4 to the HSS 4, and the HSS sends an Insert Subscriber Data message (ISD request) to a serving node, in this example the MME/SGSN 8, to request the user equipment network capabilities.

Figure 5:
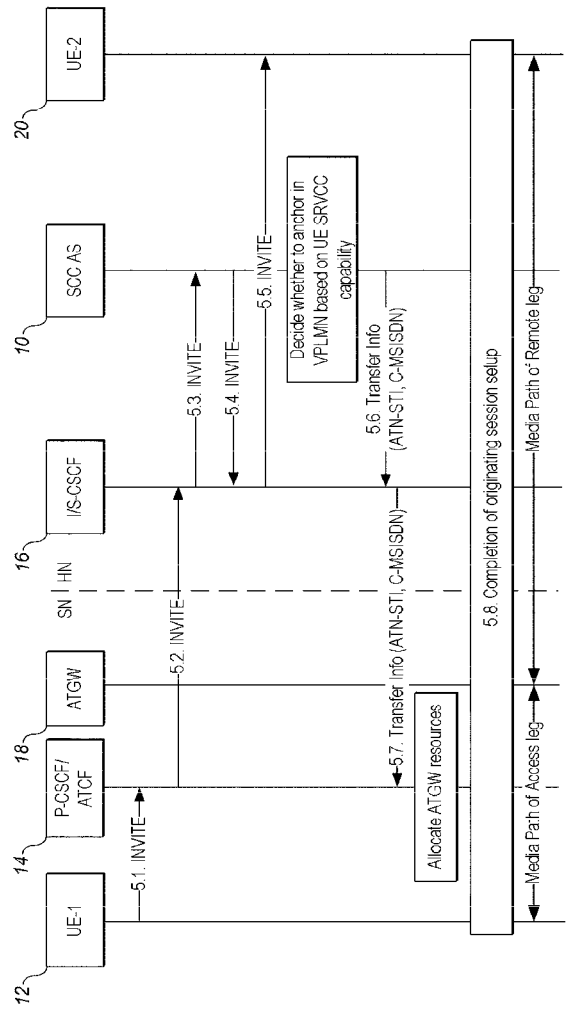
FIG. 5 is a schematic diagram showing signaling paths for a case in which a SCC AS determines that a mobile originated call should be anchored in the Visited Public Land mobile Network (VPLMN) in an embodiment of the invention.

FIG. 5 is a schematic diagram showing signaling paths for a case in which a SCC AS determines that a mobile originated call (originated by user equipment UE-1 12), should be anchored in the second wireless network, in this example a network having circuit switched capability, that may be referred to as the Visited Public Land Mobile Network (VPLMN), rather than the first wireless network, in this example a network having circuit switched capability, that may be referred to as the Home Public Land Mobile Network (HPLM).

It can be seen that the SCC AS decides whether to anchor in the VPLMN based on retrieving the user equipment network capabilities, which may be according to the procedures described in connection with FIGS. 1 to 4, and in this example decides to anchor in the VPLMN. In this example, the ATGW 18 is used to anchor the call data and the ATCF is used to anchor the call signaling. The ATGW and ATCF may in some cases be co-located with the Mobile Switching Centre (MSC). A call is established to a second user equipment UE-2 20.

Figure 6:
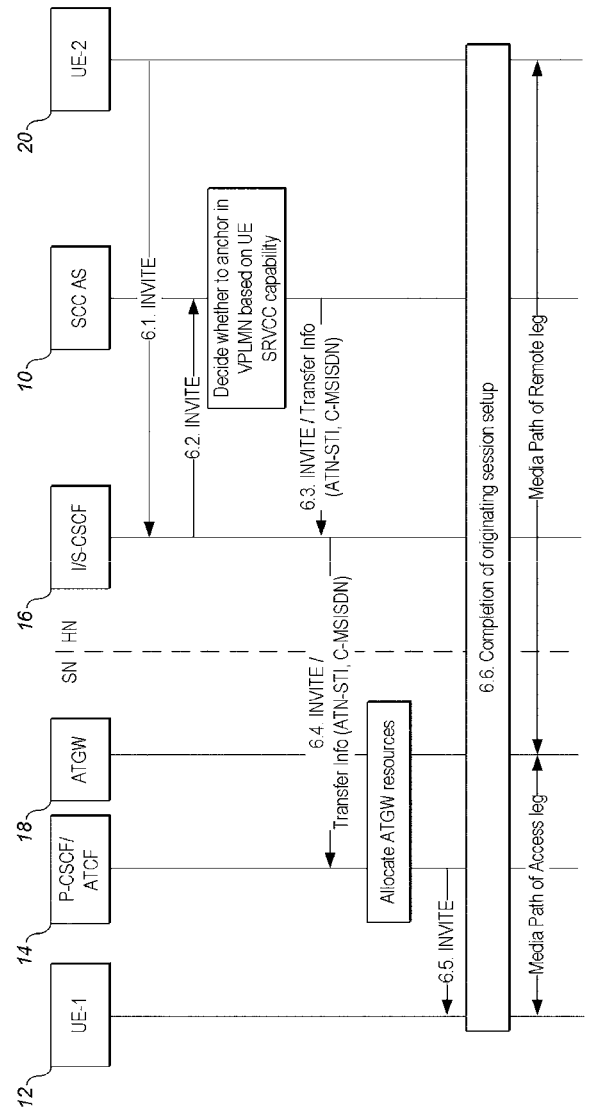
FIG. 6 is a schematic diagram showing signaling paths for a case in which a SCC AS determines that a mobile terminated call should be anchored in the Visited Public Land mobile Network (VPLMN) in an embodiment of the invention.

FIG. 6 shows an equivalent process for a mobile terminated call, terminated at UE-1 12. Similarly to the procedure for the mobile originated call shown in FIG. 5, the SCC AS decides whether to anchor in the VPLMN based on retrieving the user equipment network capabilities, decides to anchor in the VPLMN, and the ATGW 18 is used to anchor the call data and the ATCF is used to anchor the call signaling.

It should be noted that in the case that the SCC AS determines that the call should be anchored in the HPLMN, messages 5.6 and 5.7 may not be sent. The call remains anchored in the IMS; the IMS comprises at least the SCC AS 10 and the I/S-CSCF 16.

Some wireless networks, such as WiFi access networks, may not support SRVCC. Therefore, an application server may decide whether to anchor a call in dependence on an indication of an access network over which the call is originated or terminated.

In a second embodiment of the invention, the application server is a Machine-Type Communications (MTC) Server and the requested network capabilities of said user equipment relate to user equipment transport capabilities; operations of the application server applicable to specific transport capabilities of the equipment may be avoided if said user equipment does not have these capabilities. A MTC server may be used, for example, for smart metering. The user equipment may be installed devices for meter reading and sending data via a wireless network.

It can be seen from the embodiments described above that a generic mechanism is provided that would allow an application server to obtain user equipment capabilities on a basis of need.

In particular, embodiments may be applicable, but not limited to the following: enhanced SRVCC (eSRVCC) architecture in the context of SRVCC enhancements; provision of user equipment I1 capability in IMS for terminations; and MTC Server knowledge of user equipment network capabilities. In particular, retrieval of user equipment network capabilities in IMS application servers may be provided without requiring impact on the Session Initiation Protocol (SIP) in the user equipment.

In general, embodiments have the benefits that the user equipment is unmodified and that optimizations are achieved through modifications in the network procedures. The SCC AS may decide to anchor a certain voice-call in the VPLMN at the time of origination or termination in order to achieve a faster switching time when SRVCC handover is performed.

It should be noted that the network capability of a user equipment is not provided to the SCC AS by prior art SIP/IMS signaling mechanisms, and in particular information as to whether it supports SRVCC or not is not provided. Taking into account the possibility that same SCC AS may be used to anchor calls for both SRVCC and DRACK user equipments, if the SCC AS were to blindly decide to anchor all calls (including signaling and media) in the VPLMN then it may unnecessarily waste resources in the VPLMN since it would also anchor calls from DRACK user equipments that are not required to be anchored in the VPLMN.

It should be noted that application servers may benefit from knowledge of types of user equipment network capabilities other than SRVCC capability, for example I1 capability.

Embodiments of the invention may provide a mechanism that allows any IMS application server to retrieve user equipment network capabilities and make related decisions based on the capabilities of the user equipment. In this respect it allows the SCC AS to know (based on the user equipment capabilities) whether it is adequate, and would provide any benefit, to anchor the call in the VPLMN.

Embodiments of the invention may provide a mechanism that may be used by an application server to retrieve the user equipment network capability from the serving nodes, and in particular an embodiment of an application server (SCC AS) that decides to anchor a mobile originated (MO) and/or mobile terminated (MT) call based in an appropriate domain based on the capability of the user equipment.

Embodiments of the invention allow the application server to make informed decisions based on the user equipment Network Capabilities. In the case of eSRVCC architecture it allows the SCC AS to decide whether it needs to anchor the call in ATCF/ATGW based on whether the user equipment supports SRVCC, either during user equipment IMS registration or at the time a MO/MT call is received.

Embodiments may consist of a mechanism that would allow any application server to be able to request and receive user equipment network capabilities of a particular user equipment from its serving node for example SGSN/MME.

In order to keep compatibility with the existing interfaces of the different entities involved in the exchange and the overall mechanisms used in the 3GPP architecture to retrieve the user equipment network capabilities from the serving node, embodiments of the invention may use a Sh-Pull mechanism from the Application Server to the HSS and the Insert Subscriber Data from the HSS to the Serving Nodes.

Table 1 below shows a possible modification for the Sh data where a new IE may be added in order to indicate to the HSS the request to retrieve the user equipment network Capabilities from the Serving Nodes (i.e. MME/SGSN).

TABLE 1

| Data Ref. | XML tag | Defined in | Access key | Operations |
|---|---|---|---|---|
| 24 | UE Network Capabilities | Xxx | MSISDN + Data reference | Sh-Pull |

The HSS may use the existing Diameter Insert Subscriber Data Req. with modification to IDR Flags IE as shown in Table 2 below, where a new IDR flag may be introduced in order to indicate the request for UE/MS Network Capabilities or MAP messages.

TABLE 2

| Bit | Name | Description |
|---|---|---|
| 5 | UE Network Capabilities | This bit when set shall indicate that the request for MME or the SGSN the HSS requests the UEs Network Capabilities |

Note:
Bits not defined in this table shall be cleared by the sending HSS and discarded by the receiving MME.

The serving node (SGSN/MME) may answer the Insert Subscriber Data Req. using a modified ISD answer format, as shown below in Table 3, that may contain the user equipment Network Capabilities IE for this particular user equipment. Alternatively, MAP may be used.

TABLE 3

| Information element name | Mapping to Diameter AVP | Cat. | Description |
|---|---|---|---|
| UE-Network-Capabilities | UE-Network-Capabilities | C | Provides the UEs Network Capabilities information. It shall be present if the UE-Network Capabilities Information was requested within the IDR |

A new value in the "Feature-List" AVP may be used to indicate the supported features for user equipment network capabilities. A new feature-bit value may be assigned for user equipment capabilities. If MME or SGSN indicates in the ULR command that it does not support the retrieval of user equipment capability information via the IDR/IDA commands, the HSS may not set the "UE Network capabilities" bit in the IDR-Flags in subsequent IDR commands sent towards that MME or SGSN.

A possible implementation of a UE-Network-Capabilities AVP will now be described. The UE-Network-Capabilities AVP may be of type Grouped and it may contain information related to the current user equipment network capabilities stored on the serving network node.

The AVP format may be as follows:
UE-Network-Capabilities::=<AVP Header: xxx, 10415>
1*{UE-Capability}
*[AVP]

The UE-Capability AVP may be as follows:
UE-Capability::=<AVP Header: xxx, 10415>
{UE-Capability-Name}
{UE-Capability-Support}
*[AVP]

The UE-Capability-Name AVP may be of type Enumerated. Possible values for this type may include the following:
0 SRVCC from UTRAN HSPA or E-UTRAN to GERAN/UTRAN
1 I1 protocol The UE-Capability-Support AVP may be of type Enumerated with the following values:
Not Supported (0)
This value indicates that the UE does not have support of this capability.
Supported (1)
This value indicates that the UE has support of this capability.

The Application Server that receives the user equipment network capabilities IE may filter out the information that is relevant for a given application. The Application Server (SCC AS) may read the SRVCC capability IE from the user equipment network capabilities that it receives from the serving nodes (via the HSS) and determine whether it needs to anchor a mobile originating or mobile terminating call in ATGW and ATCF as shown in FIG. 5 and FIG. 6. If user equipment network capabilities indicate that the user equipment does not support SRVCC then the SCC AS may decide not to anchor in ATGW and ATCF and in this way it will save resources that would be otherwise unnecessarily wasted.

The SRVCC capability IE may be as follows:
0 SRVCC from UTRAN HSPA or E-UTRAN to GERAN/UTRAN not supported
1 SRVCC from UTRAN HSPA or E-UTRAN to GERAN/UTRAN supported FIG. 2 shows an embodiment using Diameter on the interface between the HSS and the SGSN/MME (S6a/S6d). The Sh-Pull request may be an XML-document that uses an Access-Key (which includes a Data Reference). In the Sh-pull answer, an XML document may be returned of type "User-Data". Additionally, the UML model which describes the XML document may be modified to include the user equipment capabilities.

Protocol for the Diameter Sh-Pull/Sh-Pull-Answer between the HSS and SCC AS may require changes to the conventional XML-profile sent between the HSS and SCC AS to include information related to the user equipment network capabilities.

FIG. 3 shows an embodiment using MAP on the interface between the HSS and the SGSN (Gr).

The MAP protocol relating to FIG. 3 may require changes to conventional protocol as follows:

1. The "SGSN-Capability" type that may be sent in the Update-GPRS-Location (UGL) to indicate the SGSN's capability to process a UE-Capability request. The HLR may not request this information from the SGSN when it received a Diameter-Sh pull if the UE-capability was not included. The UE-capability query support may be implemented in "SGSN-Capability" as a NULL type.

2. The "Requested-Info" type that may be used in the PSI request to request the UE-Capability from the SGSN.

3. The "Subscriber-Info" type that may be sent in the PSI-ack that may contain the results of the PSI query including the "UE capabilities".

4. The base type in the "Subscriber-Info" may point to a "constructed" MAP information element that may contain a list of supported UE network capabilities. To allow for the type to be extended, the type may be constructed with MAP ellipses notation.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method by a service centralization and continuity application server (SCC AS) in a wireless communication system, the method comprising:
receiving a first message including information regarding a network capability of a user equipment (UE) from a home subscriber server (HSS);
determining whether the UE is capable of a single radio voice call continuity (SRVCC) based on the information included in the first message; and
transmitting a second message, including information indicating whether the UE is capable of the SRVCC based on the determination, to an access transfer control function (ATCF) during internet protocol (IP) multimedia subsystem (IMS) registration,
wherein the information included in the second message is used for deciding whether to anchor a call at an access transfer gateway (ATGW).

2. The method of claim 1, wherein the wireless communication includes a first wireless network and a second wireless network, and
wherein the first wireless network is capable of supporting packet switched voice communication and the second wireless network is capable of supporting circuit switched voice communication.

3. The method of claim 2, wherein the information included in the first message is related to whether the UE has a single radio interface for communicating with the first wireless network and the second wireless network.

4. The method of claim 1, wherein the information included in the second message indicates anchoring the call at the ATGW, if the information included in the first message indicates that the UE is capable of the SRVCC.

5. The method of claim 1, wherein the information included in the second message indicates not anchoring the call at the ATGW, if the information included in the first message indicates that the UE is not capable of the SRVCC.

6. The method of claim 1, further comprising:
transmitting a message requesting the network capability of the UE to the HSS,
wherein the message is a Sh-pull message and the first message is a Sh-pull response message.

7. A service centralization and continuity application server (SCC AS) in a wireless communication system, the SCC AS comprising:

a transceiver configured to transmit and receive a signal; and a controller configured to:
- receive a first message including information regarding a network capability of a user equipment (UE) from a home subscriber server (HSS);
- determine whether the UE is capable of a single radio voice call continuity (SRVCC) based on the information included in the first message; and
- transmit a second message, including information indicating whether the UE is capable of the SRVCC based on the determination, to an access transfer control function (ATCF) during internet protocol (IP) multimedia subsystem (IMS) registration, wherein the information included in the second message is used for deciding whether to anchor a call at an access transfer gateway (ATGW).

8. The SCC AS of claim 7, wherein the wireless communication includes a first wireless network and a second wireless network, and
wherein the first wireless network is capable of supporting packet switched voice communication and the second wireless network is capable of supporting circuit switched voice communication.

9. The SCC AS of claim 8, wherein the information included in the first message is related to whether the UE has a single radio interface for communicating with the first wireless network and the second wireless network.

10. The SCC AS of claim 7, wherein the information included in the second message indicates anchoring the call at the ATGW, if the information included in the first message indicates that the UE is capable of the SRVCC.

11. The SCC AS of claim 7, wherein the information included in the second message indicates not anchoring the call at the ATGW, if the information included in the first message indicates that the UE is not capable of the SRVCC.

12. The SCC AS of claim 7, further comprising:
transmitting a message requesting the network capability of the UE to the HSS,
wherein the message is a Sh-pull message and the first message is a Sh-pull response message.

* * * * *